United States Patent [19]

Miyabayashi

[11] Patent Number: 5,482,775
[45] Date of Patent: Jan. 9, 1996

[54] SILICON COMPOSITION AND ELASTIC ROLLER USING THE COMPOSITION

[75] Inventor: Toshiyuki Miyabayashi, Okaya, Japan

[73] Assignee: Canon Kabushiki Kaisha, Tokyo, Japan

[21] Appl. No.: 126,006

[22] Filed: Sep. 24, 1993

Related U.S. Application Data

[63] Continuation of Ser. No. 472,875, Jan. 31, 1990, abandoned.

[30] Foreign Application Priority Data

Feb. 2, 1989 [JP] Japan ................................. 64-025276
Sep. 14, 1989 [JP] Japan ................................. 64-238954

[51] Int. Cl.$^6$ ............................. B32B 9/00; B32B 25/20
[52] U.S. Cl. .......................... 428/391; 428/375; 428/379; 428/447; 492/56; 528/15; 528/26; 528/42
[58] Field of Search ..................... 428/447, 391, 428/375, 379, 390, 389; 525/478, 479; 492/56; 528/15, 25, 26, 42

[56] References Cited

U.S. PATENT DOCUMENTS

| | | | |
|---|---|---|---|
| 3,879,319 | 4/1975 | Sato et al. | 525/479 |
| 3,949,136 | 4/1976 | Deiner et al. | 525/479 |
| 4,123,472 | 10/1978 | Getson et al. | 525/478 |
| 4,147,832 | 4/1979 | Namiki | 428/383 |
| 4,711,818 | 12/1987 | Henry | 428/447 |
| 4,810,564 | 3/1989 | Takahashi et al. | 428/329 |
| 4,818,805 | 4/1989 | Ikeno et al. | 525/478 |
| 4,830,893 | 5/1989 | Nakamura et al. | 428/391 |
| 4,969,711 | 11/1990 | Rogler et al. | 428/391 |
| 4,970,559 | 11/1990 | Miyabayashi | 355/290 |
| 4,985,526 | 1/1991 | Kishita et al. | 525/478 |
| 5,095,067 | 3/1992 | Hara et al. | 524/506 |
| 5,104,927 | 4/1992 | Hara et al. | 524/731 |

FOREIGN PATENT DOCUMENTS

| | | |
|---|---|---|
| 280437 | 8/1988 | European Pat. Off. . |
| 322099 | 6/1989 | European Pat. Off. . |

OTHER PUBLICATIONS

Derwent Acc. No. 87–112138 Quested Telesystems (WPIL) Derwent Publ. Ltd., London & JP62057439 (Fuji Xerox).
Patent Abstracts of Japan, vol. 10. No. 190 (P–474) (2246) Jul. 4, 1986 (JP-A-61 36778 (Ricoh) Dec. 5, 1983).
Patent Abstracts of Japan, vol. 8, No. 60 (P–262) (1947) Mar. 22, 1984 (JP-A-58208774 (Ricoh) Dec. 5, 1983).

Primary Examiner—Patrick J. Ryan
Assistant Examiner—J. M. Gray
Attorney, Agent, or Firm—Fitzpatrick, Cella, Harper & Scinto

[57] ABSTRACT

A silicone composition is formed as a system including a silicone compound, and an unsaturated ester compound having a perfluoro-alkyl group containing 1–20 carbon atoms. The silicone composition is heat-cured to provide a solid silicone rubber composition suitably constituting the surface layer of an elastic revolution body which in turn is suitably used to constitute one or both of a fixing roller and a mating pressure roller in a heat-pressure roller fixing device for electrophotography. In the solid silicone rubber composition, the unsaturated ester compound is stably fixed through reaction with the silicone compound due to the presence of the reactive unsaturation group so that its antistatic effect is retained for a long period.

10 Claims, 2 Drawing Sheets

SILICON COMPOSITION AND ELASTIC ROLLER USING THE COMPOSITION

This application is a continuation-in-part continuation of application Ser. No. 07/472,875 filed Jan. 31, 1990, now abandoned.

FIELD OF THE INVENTION AND RELATED ART

The present invention relates to a silicone composition, a solid silicone rubber composition formed from the silicone composition, an elastic revolution body having a surface layer comprising the silicone rubber composition, and a fixing device equipped with the elastic revolution body.

In an image forming apparatus such as an electrophotographic copying machine, conveying ability, releasability and durability are generally required for the conveyor roller for conveying a sheet transfer material (or recording medium) such as plain paper or a plastic film along a prescribed conveying path. Further, conveying ability, releasability, abrasion resistance, fixing characteristics and durability are also required under severe conditions with respect to a fixing device comprising a fixing roller and a pressure roller, which applies heat to an unfixed toner image formed on a transfer paper under pressure and must convey the transfer paper to the prescribed conveying path while preventing an offset phenomenon due to sintered or melted toner.

Conventionally, the fixing device of this type comprises at least a fixing roller and a mating pressure roller or pressing roller which contacts the fixing roller under pressure and rotates mating with the fixing roller. The fixing roller comprises a hollow core bar (or cylinder) formed of a material such as aluminum or iron, and a layer of a material having good releasability such as silicone rubber and fluorine-containing resin including polytetrafluoroethylene (PTFE), tetrafluoroethylene-fluoroalkoxyethylene copolymer (PFA), etc., which covers the core bar. Inside the fixing roller, a heater such as a halogen lamp is disposed as desired, thereby to elevate the surface temperature of the fixing roller to a temperature suitable for the fixing. In many cases, the above-mentioned surface temperature of the fixing roller is controlled by means of a sensor so that it is set to a prescribed temperature. Further, around the peripheral surface of the fixing roller, there is sometimes disposed a cleaner for removing the offset toner and paper dust, or a separation claw for preventing an image-supporting material such as transfer material or recording material from winding about the fixing roller.

On the other hand, the pressure roller comprises a core bar formed of a metal such as iron and stainless steel, and an elastic layer having releasability and comprising a material such as silicone rubber, which covers the core bar. The pressure roller is caused to contact the fixing roller under pressure by a pressure-applying means such as a spring.

The image-supporting material carrying thereon an unfixed toner image is sandwiched between and conveyed by the above-mentioned fixing roller and pressure roller under pressure, whereby the unfixed toner image is fixed to the image-supporting material under heating and pressure. However, in the conventional fixing device, the pressure roller is charged to have a high voltage (e.g., over 2 KV) because of triboelectrification when the paper is passed through the device, whereby a problem such as paper winding about the pressure roller is liable to occur. Further, there is posed a problem that unfixed toner particles are scattered by the electric field due to the pressure roller to blur line images, or that the toner is attached to the fixing roller surface to often cause the offset phenomenon.

In the prior art, in order to solve the above-mentioned problems, a discharge brush is caused to contact the pressure roller thereby to discharge it by grounding. However, the potential of the pressure roller is only decreased to about 1–2 KV, whereby the discharge effect is limited and is insufficient.

In the case of a fixing device without cleaning means for cleaning the fixing roller surface, the amount of toner particles attached to the fixing roller surface is increased when the surface of the pressure roller is considerably charged to the same polarity as the toner, whereby there is liable to occur a problem of image failure such as the offset, and/or of staining of the roller surface with toner particles attached thereto.

In a fixing device using a roller under heating and pressure, it has been found that when there is used a pressure roller having a surface layer comprising a silicone rubber composition obtained by adding a surfactant such as fluorine-containing surfactant to a silicone rubber, the charging of the pressure roller is suppressed and therefore the amount of the toner attached to the fixing roller surface is remarkably reduced. Further, there is also observed an improvement in respects of image failure such as the offset and staining of the pressure roller with toner particles attached thereto.

However, in the system as described above, the surfactant is gradually lost from the silicone rubber so that the antistatic performance is gradually decreased to cause a problem in respect of maintenance of the effect for a long period of term.

SUMMARY OF THE INVENTION

The present invention generally aims at providing a silicone composition, a solid silicone rubber composition formed from the silicone composition, an elastic revolution body comprising the solid silicone rubber composition having an excellent anti-static effect.

Another object of the present invention is to provide a silicone rubber capable of providing a solid silicone rubber composition having an excellent discharging (or charge-removing) effect.

Another object of the present invention is to provide an elastic revolution body having a surface which is not readily stained.

Another object of the invention is to provide an elastic revolution body having an excellent durability.

A further object of the invention is to provide a fixing device having an excellent antioffset characteristic.

A still further object of the invention is to provide a fixing device having an excellent durability.

According to the present invention, there is provided a silicone composition, comprising: a silicone compound, and an unsaturated ester compound having a perfluoro-alkyl group containing 1–20 carbon atoms.

The present invention further provides a shaped body obtained from the above composition.

The present invention further provides an elastic revolution body having an elastic surface layer formed of a solid silicone rubber composition obtained from the silicone composition.

According to the present invention, there is further provided a fixing device comprising a pair of rollers for passing therebetween a toner-supporting material carrying an unfixed toner image to fix the toner image onto the toner-supporting material; wherein at least one of said pair of rollers comprises an elastic surface layer comprising a solid silicone rubber composition which has been obtained from a silicone composition comprising a vinyl group containing silicone compound and an unsaturated ester compound having a perfluoroalkyl group containing 1–20 carbon atoms.

These and other objects, features and advantages of the present invention will become more apparent upon a consideration of the following description of the preferred embodiments of the present invention taken in conjunction with the accompanying drawings.

DETAILED DESCRIPTION OF THE INVENTION

The silicone composition according to the invention is able to provide a solid silicone rubber product capable of preventing or suppressing charge-up or accumulation of static electricity of the product by containing an unsaturated ester compound having a perfluoroalkyl group containing 1–20 carbon atoms (i.e., a $C_1$–$C_{20}$ perfluoroalkyl group). The unsaturated ester compound is reacted with a reactive silicone compound (or a reactive component in the compound if the silicone compound is a mixture) to be fixed in the resultant solid rubber shaped product, so that the perfluoroalkyl group-containing unit is prevented from being lost and maintains the antistatic performance thereof for a long period.

The unsaturated ester compound having a $C_1$–$C_{20}$ perfluoroalkyl has a reactive unsaturation group and may further preferably have a surfactant structure including a hydrophobic group and a hydrophilic group (hydrophilic atomic group). The reactive unsaturation group may preferably be a vinyl group ($CH_2=C<$). The hydrophobic group may be provided by the perfluoroalkyl group ($C_nF_{2n+1}$-) having 1–20 carbon atoms. The hydrophilic group may preferably comprise an ethylene oxide group (or (poly)oxyethylene group) having a number of added ethylene oxide units of 1–30, further preferably 5–30, in view of excellent antistatic performance.

In the silicone composition of the present invention, the unsaturated ester compound may preferably be contained in a proportion of 0.05–10 wt. %, more preferably 0.09–9 wt. %, further preferably 0.4–8 wt. %, with respect to the total weight of (organic) silicone compound (including components (I)–(II) and/or (V) described hereinafter) so as to provide a good antistatic performance.

A fixing roller and a pressure roller used in an image forming apparatus, such as an electrophotographic copying apparatus, may be used at an elevated temperature above 100° C. and around 200° C. For such a usage, the surfactant structure originated from the unsaturated ester compound may preferably be a heat-resistance one.

Suitable examples of the unsaturated ester compound having a $C_1$–$C_{20}$ perfluoroalkyl group may include those represented by the following formulas (A), (B), (C) and (D) which will be described in detail:

Formula (A)

wherein $R_1$ denotes a monovalent hydrocarbon group, $R_2$ denotes hydrogen or methyl group, n denotes an integer of 1–20, L denotes and m denotes an integer of 1–30.

More specific examples of the unsaturated ester compound represented by the above formula (A) may include those of the following formulas (1)–(4):

Formula (1)

Formula (2)

Formula (3)

Formula (4)

Formula (B)

wherein $R_3$ denotes hydrogen atom or methyl group, denotes an integer of 1–30, and R denotes an integer of 1–20;

Formula (C)

wherein $R_3$ denotes hydrogen atom or methyl group, denotes an integer of 1–30, and R denotes an integer of 1–20;

Formula (D)

wherein $R_3$ denotes hydrogen atom or methyl group, m denotes an integer of 1–30, and n denotes an integer of 1–20; and Formula (E)

wherein $R_3$ denotes hydrogen atom or methyl group, m denotes an integer of 1–30, and n denotes an integer of 1–20.

The silicone composition according to the present invention comprises at least the silicone compound and the unsaturated ester compound having a $C_1$–$C_{20}$ perfluoroalkyl group.

The silicone composition according to the present invention may preferably be formulated to constitute an addition reaction-type silicone rubber composition or a radical reaction-type silicone rubber composition.

The addition reaction-type silicone rubber composition may comprise at least the following components (I)–(IV):

Component (I): A vinyl group-containing organosiloxane as a silicone polymer component.

Examples of the vinyl group-containing organopolysiloxane may include:

a vinyl group-terminated organosiloxane represented by the following formula (a):

wherein x denotes a positive integer, preferably in the range of 50–2,000, and a side vinyl group-containing organopolysiloxane represented by the following formula (b):

wherein y and z independently denote a positive integer.

A preferred class of the side vinyl group containing organopolysiloxane may be represented by the following formula (c):

wherein k is 0 or a positive integer, y+k provides an integer of 50 –2000, and z is an integer of 1–10.

The component (I) can be a mixture of a vinyl group-terminated organopolysiloxane and a side vinyl group-containing or organopolysiloxane as described above.

The component (I) may preferably be in the form of a liquid having a viscosity of 500–5×10⁶ centistokes at room temperature in view of processing and shaping characteristic.

Specific examples of the component (I) (vinyl group-containing organopolysiloxane) may include: methylvinylpolysiloxane, methylvinylsiloxane/dimethylsiloxane copolymer, dimethylpolysiloxane with both ends terminated with dimethylvinylsiloxy group, dimethylsiloxane/methylphenylsiloxane copolymer with both ends terminated with dimethylvinylsiloxy group, dimethylsiloxane/diphenylsiloxane/methylvinylsiloxane copolymer with both ends terminated with dimethylvinylsiloxy group, dimethylsiloxane/methylvinylsiloxane copolymer with both ends terminated with trimethylsiloxy group, dimethylsiloxane/methylphenylsiloxane/methylvinylsiloxane copolymer with both ends terminated with trimethylsiloxy group, methyl(3,3,3trifluoropropyl)polysiloxane with both ends terminated with dimethylvinylsiloxy group, and dimethylsiloxane/methyl (3,3,3-trifluoropropyl)siloxane copolymer with both ends terminate with dimethylvinylsiloxy group.

Component (II): An organohydrogenpolysiloxane.

Examples thereof may include organohydrogenpolysiloxane having one or more silicon (Si)-bonded hydrogen atoms, preferably three or more silicon-bonded hydrogen atoms, represented by the following formula (d):

wherein q and q independently denote a positive integer.

A preferred class of the organohydrogenpolysiloxane may include methylhydrogenpolysiloxanes represented by the following formula (e):

wherein r is 0 or a positive integer, p+r provides an integer of 50–500, and q is an integer of 3–10.

Component (III): A platinum-based catalyst for promoting the curing or hardening of the silicone composition. The platinum-based catalyst may preferably be used at a concentration of 100–5000 ppm in the curing system.

Component (IV).: The above-mentioned unsaturated ester compound having a $C_1$–$C_{20}$ perfluoroalkyl group.

In the silicone rubber composition of the addition reaction-type as described above, the vinyl group bonded to silicon atom in the component (I) and the hydrogen atom bonded to silicon atom (—Si—H group)

in the component (II) are caused to react with each other under heating in the presence of the platinum-based catalyst to provide a rubbery elastomer product. Further, the unsaturated group in the unsaturated ester compound (component (IV)) is reacted with the silicon-bonded hydrogen atom in the component (II) under heating in the presence of the platinum-based catalyst, whereby the component (IV) is fixed in the rubbery elastomer product.

The addition reaction-type silicone rubber composition may preferably comprise 1–10 wt. parts of the component (II) and 0.1–10 wt. parts (more preferably 0.5–8 wt. parts) of the component (IV) per 100 wt. parts of the component (I), and the component (III) in a proportion of 100–5000 ppm of the total of the components (I)–(IV).

It is preferred that the molar ratio of the Si-bonded hydrogen atom in the component (II) to the vinyl group contained in the components (I) and (IV) is in the range of 0.5–2.0, preferably 0.6–1.5, further preferably 0.8–1.2, particularly about 1 (0.95–1.05) in view of the releasability of the silicone rubber composition after the reaction.

The reaction in the presence of the platinum-based catalyst may preferably be performed at a temperature of 100°–180° C. for 0.5–20 min. It is further preferred to subject the silicone rubber composition after the reaction to post-curing at 150°–210° C. (particularly 160°–200° C.) for 0.5–10 hours (particularly 1–8 hours).

The radical reaction-type silicone rubber composition may comprise at least the following components (V) and (VI) and the component (IV) (the unsaturated ester compound described above).

Component (V): A silicone polymer component which may, for example, be an organopolysiloxane having a partial structure of the formula:

wherein R denotes alkyl group, aryl group or polyfluoroalkyl group, or a vinyl group containing organopolysiloxane having a partial structure of the formula:

wherein R denotes alkyl group, aryl group or polyfluoroalkyl group.

The component (V) can be a mixture of the above-mentioned organopolysiloxane and the vinyl group containing organopolysiloxane.

Component (VI): A vulcanizing agent which may, for example, be a peroxide, such as benzoyl peroxide, dicumyl peroxide and di-tertiary-butyl peroxide.

The silicone rubber composition of the radial reaction-type may preferably comprise 0.1–5 wt. parts of the component (VI) and 0.1–10 wt. parts (particularly 0.5–8 wt. parts) of the component (IV) per 100 wt. parts of the component (V).

The silicone rubber composition of the radical reaction-type according to the present invention causes a radical reaction under heating in the presence of the peroxide to form a rubbery elastomer product while the unsaturation group in the component (IV) also cause a reaction, whereby the component (IV) is fixed in the elastomer product. The radical reaction may for example be performed at 100°–200° C. for 3–30 min., particularly 5–20 min.

In the silicone composition in a liquid state according to the present invention, the unsaturated ester compound having a reactive group and a $C_1$–$C_{20}$ perfluoroalkyl group is reacted with a reactive component in the silicone compound to provide a solid silicone rubber composition with a prevented or suppressed chargeability. More specifically, the reactive fluorine-containing unsaturated ester compound is reacted with a reactive component in the silicone compound to be fixed in the resultant solid silicone rubber composition, whereby the unsaturated ester compound is prevented from being released or lost from the solid silicone rubber composition so that the solid silicone rubber composition can retain its antistatic performance for a long period.

In case where the solid silicone rubber composition prepared from the silicone composition according to the present invention is used to constitute an elastic surface layer of a fixing roller or a pressure roller in a toner image-fixing device in an image forming apparatus, such as an electrophotographic copying apparatus, the charging of the roller surface is effectively prevented or suppressed, so that the amount of attached toner on the roller surface is remarkably decreased to prevent image failure, such as offset and contamination due to toner attachment onto the roller surfacer and also problems accompanying conveyance of recording or transfer material, such as paper winding and paper curl.

More specifically, the reactive fluorine-containing unsaturated ester compound is fixed in the solid silicone rubber layer constituting the surface of a roller, so that good charge-suppressing effect and discharging effect can be maintained for a long period. As a result, problems such as contamination due to toner onto roller surface, paper winding about the roller, and paper curling can be prevented for a long period, and further the durability of the roller can be remarkably increased.

The solid silicone rubber composition prepared from the silicone composition according to the invention can be used to surface both or either one of a pair of rollers for fixation including a fixing roller and a mating pressure roller.

The silicone composition and therefore the solid silicone rubber composition according to the present invention can contain fillers, such as fine powdery synthetic silica, quartz powder, fused quartz powder, diatomaceous earth and calcium carbonate in a proportion of, e.g., 0.–40 wt. %, particularly 1–10 wt. % of fine powdery synthetic silica as a reinforcing agent; and other additives inclusive of a heat resistance improver comprising iron oxide such as red iron oxide in a proportion of, e.g., 0.1–5 wt. %; compression permanent stress improvers, such as titanium oxide and zinc oxide in a proportion of, e.g., 0–5 wt. %; and a dispersant such as low-molecular weight siloxane in a proportion of, e.g., 0–5 wt. %, respectively, based in the total weight of the silicone compound (including the components (I) and (II) and/or component (V)).

The elastic revolution body according to the present invention comprises an elastic member formed of the above-mentioned silicone rubber composition. The fixing device according to the present invention comprises a pair of rollers for passing therebetween a toner-supporting material carrying an unfixed toner image to fix the toner image onto the toner-supporting material under heating and pressure.

Hereinbelow, an embodiment of the elastic revolution body and the fixing device according to the present invention is described with reference to the accompanying drawings.

Figure 1:
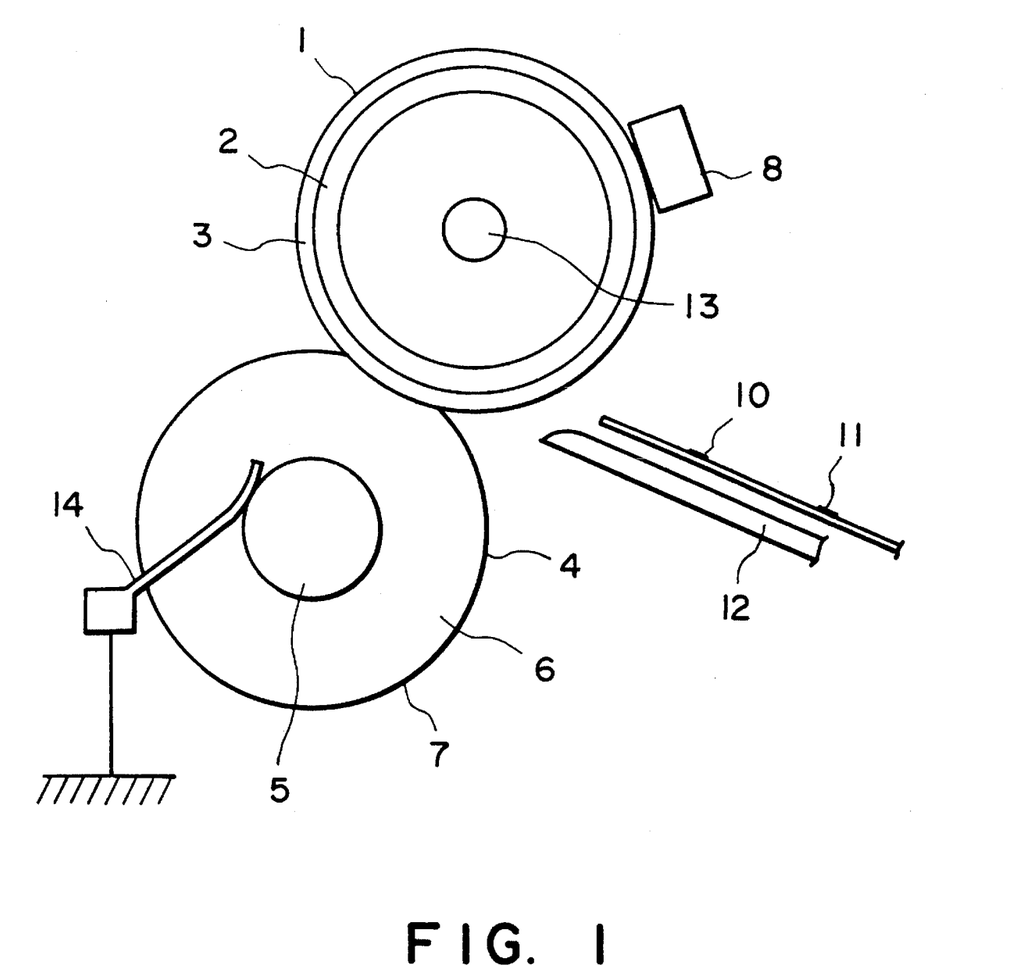
FIG. 1 is a schematic longitudinal sectional view of an embodiment of the fixing device according to the present invention.

FIG. 1 is a longitudinal schematic sectional view showing an arrangement of the fixing device which has the elastic revolution body according to the present invention as a pressure roller.

Referring to FIG. 1, the fixing device comprises a fixing roller 1 comprising a core bar or cylinder 2 formed of a metal such as aluminum, iron and stainless steel; and a resin layer 3 formed on the outer surface of the core bar 2 comprising a resin having heat-resistance and releasability of, e.g., a fluorine-containing resin such as tetrafluoroethyleneperfluoroalkyl vinyl ether copolymer (PFA) or polytetrafluoroethylene (PTFE). Inside the core bar 2, a heating means 13 such as a heater is disposed.

Opposite the fixing roller 1, a pressure roller 4 is disposed to contact it under pressure by means of a pressing means (not shown) such as a spring so that it rotates corresponding to the rotation of the fixing roller 1. The pressure roller 4 comprises a core bar 5 formed of a metal such as iron and stainless steel, and an elastic layer 6 formed thereon which is formed from the silicone rubber composition according to the present invention.

Around the fixing roller 1, there may be disposed, as desired, a thermistor 8 for detecting the temperature of the fixing roller 1, or a cleaner (not shown) contacting the fixing roller 1 to clean the surface thereof. There is disposed an inlet guide 12 for introducing a toner-supporting material (or transfer material) 11 such as plain paper having thereon a toner image 10, between the fixing roller 1 and the pressure roller 4. On the other hand, a conductive flat spring 14 is disposed for grounding the core bar 5 of the pressure roller 4.

Hereinbelow, the present invention will be described in more detail with reference to Examples and Comparative Examples.

EXAMPLE 1

The following components (I)–(VII) were provided.

| | |
|---|---|
| Component (I): Vinyl group-containing dimethylpolysiloxane comprising dimethylpolysiloxane having terminal vinyl groups and dimethylpolysiloxane having terminal methyl groups and vinyl groups in side chains, containing total vinyl groups at a rate of $8.0 \times 10^{-5}$ mol/g | 100 wt. parts |
| Component (II): Methylhydrogenpolysiloxane containing Si-bonded hydrogen atoms at a rate of $2.0 \times 10^{-3}$ mol/g | 4.5 wt. parts |
| Component (III): Platinum-based catalyst | 0.001 wt. part |
| Component (IV): Reactive fluorine-containing unsaturated ester compound represented by the formula: $$C_8F_{17}SO_2NCH_2CH_2O\text{-}(CH_2CH_2O)_{10}\text{-}CH_2CH_2\underset{OH}{C}HCH_2O\underset{O}{\overset{\|}{C}}CH=CH_2$$ with $C_3H_7$ on N | 1 wt. part |
| Component (V): Dry-process silica fine powder having a specific surface area of 200 m²/g | 5 wt. parts |
| Component (VI): Pulverized quartz powder having an average particle size of 5 microns | 20 wt. parts |
| Component (VII): Red iron oxide | 1 wt. part |

The above components (I)–(VII) were uniformly mixed to prepare a silicone composition. The silicone composition, after defoaming, was heated for min. in a hot press at 150° C. to form a solid silicone rubber product, which was then post-cured at 200° C. for 4 hours.

EXAMPLE 2

The following components (I)–(VII) were provided.

| | |
|---|---|
| Component (I): Vinyl group-containing dimethylpolysiloxane comprising dimethylpolysiloxane having terminal vinyl groups and dimethylpolysiloxane having terminal methyl groups and vinyl groups in side chains, containing total vinyl groups at a rate of $8.0 \times 10^{-5}$ mol/g | 100 wt. parts |
| Component (II): Methylhydrogenpolysiloxane containing Si-bonded hydrogen atoms at a rate of $2.0 \times 10^{-3}$ mol/g | 4.5 wt. parts |
| Component (III): Platinum-based catalyst | 0.001 wt. part |
| Component (IV): Reactive fluorine-containing unsaturated ester compound represented by the formula: | 1 wt. part |

| | |
|---|---|
| Component (V): Dry-process silica fine powder having a specific surface area of 200 m²/g | 5 wt. parts |
| Component (VI): Pulverized quartz powder having an average particle size of 5 microns | 20 wt. parts |
| Component (VII): Red iron oxide | 1 wt. part |

The above components (I)–(VII) were uniformly mixed to prepare a silicone composition. The silicone composition, after defoaming, was heated for 10 min. in a hot press at 150° C. to form a solid silicone rubber product, which was then post-cured at 200° C. for 4 hours.

Comparative Example 1

The following components (I)–(VI) were provided.

| | |
|---|---|
| Component (I): Vinyl group-containing dimethylpolysiloxane comprising dimethylpolysiloxane having terminal vinyl groups and dimethylpolysiloxane having terminal methyl groups and vinyl groups in side chains, containing total vinyl groups at a rate of $8.0 \times 10^{-5}$ mol/g | 100 wt. parts |
| Component (II): Methylhydrogenpolysiloxane containing Si-bonded hydrogen atoms at a rate of $2.0 \times 10^{-3}$ mol/g | 4.5 wt. parts |
| Component (III): Platinum-based catalyst | 0.001 wt. part |
| Component (IV): Dry-process silica fine powder having a specific surface area of 200 m²/g | 5 wt. parts |
| Component (V): Pulverized quartz powder having an average particle size of 5 microns | 20 wt. parts |
| Component (VI): Red iron oxide | 1 wt. part |

The above components (I)–(VI) were uniformly mixed to prepare a silicone composition. The silicone composition, after defoaming, was heated for 10 min. in a hot press at 150° C. to form a solid silicone rubber product, which was then post-cured at 200° C. for 4 hours.

The silicone rubber products obtained in Example 1, Example 2 and Comparative Example 1 were subjected to measurement of charge-prevention and discharge effects in the following manner.

Figure 2:
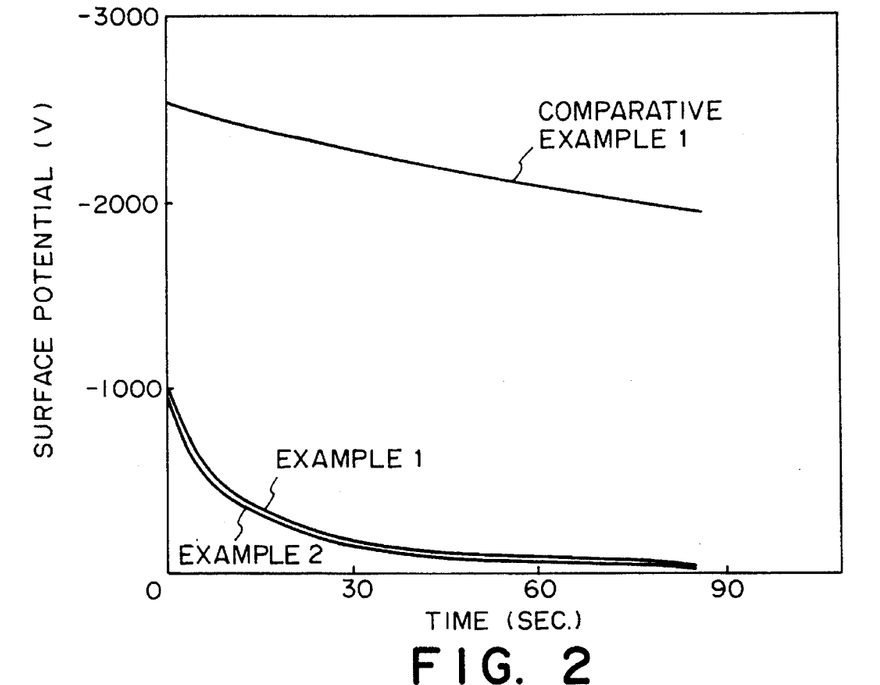
FIG. 2 is a graph showing a change in surface potential with lapse of time of solid silicone rubber compositions in the form of flat plates formed from silicone compositions of Example 1, Example 2 and Comparative Example 1.

Each test piece in the form of a flat plate measuring 200 mm×60 mm×2 mm of silicone rubber product was subjected to corona discharge at −5000 volts for a prescribed period of 1 second, and the change in surface potential of the test piece immediately after the corona discharge was measured by means of a surface potential meter using a sensing plate probe. The results are shown in FIG. 2.

EXAMPLE 3

A pressure roller for a heat-pressure fixing device having an elastic layer of a solid silicone rubber composition according to the present invention was prepared in the following manner.

A stainless steel-core bar with an outer diameter of 10 mm for the pressure roller was coated with a siloxane-type primer and then placed in a cylindrical metal mold. Into the mold pre-heated to 130° C. the silicone composition of Example 1, after sufficient defoaming, was injected and held for 10 min. at the temperature to be cured.

The silicone rubber-coated pressure roller was taken out of the metal mold after the curing and found to have an outer diameter of 16 mm and a 3 mm-thick silicone rubber coating layer.

The above-prepared pressure roller was incorporated in a heat-pressure fixing device shown in FIG. 1, and a fixing test was conducted while sheets of paper were continuously passed through the fixing device under the conditions shown below. The fixing roller 1 used at that time was composed of an aluminum core bar with an outer diameter of 20 mm coated with a 15 micron-thick tetrafluoroethylene resin layer. <Fixing Conditions>

Controlled temperature of the fixing roller surface=150° C.

Nip pressure between the fixing roller and pressure roller=6 kgf

Supplied paper: A4 size transfer paper (plain paper) carrying an unfixed toner image corresponding to a test pattern.

Paper supply speed: 4 sheets/min.

As a result, even after 100,000 sheets of paper were passed through the fixing device, no attachment or contamination with toner was caused on the pressure roller surface nor was caused attachment of toner onto the fixing roller surface. In the fixed toner images, no poor image, contamination or dropout of image was observed at all, but good image quality and fixing performance were retained. Particularly, no paper wrinkle, paper stacking or jamming, or paper curl, was observed to show a good conveying characteristic of the fixing device. The pressure roller caused very little shape change, thus showing a good size stability.

EXAMPLE 4

A silicone rubber-coated pressure roller was prepared in the same manner as in Example 3 except that the silicone rubber composition prepared in Example 2 was used. The thus obtained pressure roller was used and evaluated in a continuous feeding fixing test similarly as in Example 3.

Even after 100,000 sheets of paper were passed through the fixing device, no attachment or contamination with toner was caused on the pressure roller surface nor was caused attachment of toner onto the fixing roller surface. No poor image, contamination or dropout of image was observed at all, but good image quality and fixing performance were retained. Particularly, no paper wrinkle, paper stacking or jamming, or paper Curl, was observed to show a good conveying characteristic of the fixing device. The pressure roller caused very little shape change, thus showing a good size stability.

Comparative Example 2

A pressure roller was prepared in the same manner as in Example 3 except that the silicone composition of Comparative Example 1 was used. The obtained pressure roller was incorporated in the fixing apparatus shown in FIG. 1 and subjected to the fixing test in the same manner as in Example 3. As a result, contamination due to toner attachment on the pressure roller surface was increased after passing 10,000 sheets of paper, and there occurred problems of poor images, contamination and dropout of images, paper wrinkle, paper jamming or/and paper curling.

EXAMPLE 5

The following components (I)–(VII) were provided.

| | |
|---|---|
| Component (I): Vinyl group-containing dimethylpolysiloxane comprising dimethylpolysiloxane having terminal vinyl groups and dimethylpolysiloxane having terminal methyl groups and vinyl groups in side chains, containing total vinyl groups at a rate of $8.0 \times 10^{-5}$ mol/g | 100 wt. parts |
| Component (II): Methylhydrogenpolysiloxane containing Si-bonded hydrogen atoms at a rate of $2.0 \times 10^{-3}$ mol/g | 4.5 wt. parts |
| Component (III): Platinum-based catalyst | 0.001 wt. part |
| Component (IV): Reactive fluorine-containing unsaturated ester compound represented by the formula: $C_8F_{17}CH_2\text{-}(OCH_2CH_2)_{10}\text{-}OCH_2CH_2CHCH_2OC\text{-}CH=CH_2$ with OH and O (double bond) | 1 wt. part |
| Component (V): Dry-process silica fine powder having a specific surface area of 200 m$^2$/g | 5 wt. parts |
| Component (VI): Pulverized quartz powder having an average particle size of 5 microns | 20 wt. parts |
| Component (VII): Red iron oxide | 1 wt. part |

The above components (I)–(VII) were uniformly mixed to prepare a silicone composition. The silicone composition, after defoaming, was heated for 10 min. in a hot press at 150° C. to form a solid silicone rubber product, which was then post-cured at 200° C. for 4 hours.

EXAMPLE 6

The following components (I)–(VII) were provided.

| | |
|---|---|
| Component (I): Vinyl group-containing dimethylpolysiloxane comprising dimethylpolysiloxane having terminal vinyl groups and dimethylpolysiloxane having terminal methyl groups and vinyl groups in side chains, containing total vinyl groups at a rate of $8.0 \times 10^{-5}$ mol/g | 100 wt. parts |
| Component (II): Methylhydrogenpolysiloxane containing Si-bonded hydrogen atoms at a rate of $2.0 \times 10^{-3}$ mol/g | 4.5 wt. parts |
| Component (III): Platinum-based catalyst | 0.001 wt. part |
| Component (IV): Reactive fluorine-containing unsaturated ester compound represented by the formula: $C_8F_{17}\text{-}(OCH_2CH_2)_{10}\text{-}OCC=CH_2$ with R and O (double bond) | 1 wt. part |
| Component (V): Dry-process silica fine powder having a specific surface area of 200 m$^2$/g | 5 wt. parts |
| Component (VI): Pulverized quartz powder having an average particle size of 5 microns | 20 wt. parts |
| Component (VII): Red iron oxide | 1 wt. part |

The above components (I)–(VII) were uniformly mixed to prepare a silicone composition. The silicone composition, after defoaming, was heated for 10 min. in a hot press at 150° C. to form a solid silicone rubber product, which was then post-cured at 200° C. for 4 hours.

The silicone rubber products obtained in Example 5, and Example 6 were subjected to measurement of charge-prevention and discharge effects in the same manner as Examples 1 and 2 and Comparative Example 1.

Figure 3:
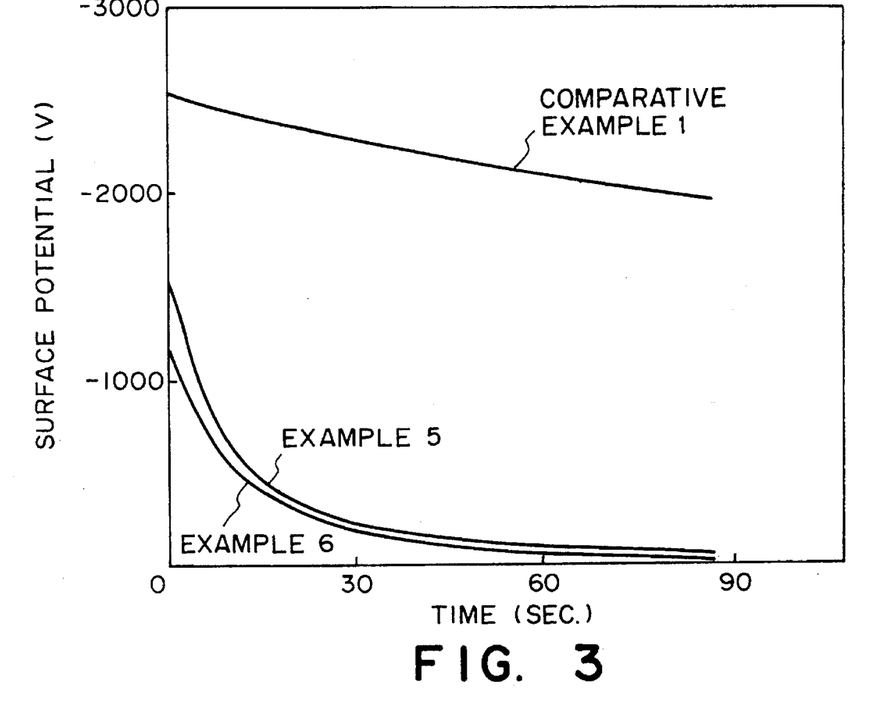
FIG. 3 is a graph showing a change in surface potential with lapse of time of solid silicone rubber compositions in the form of flat plates formed from silicone compositions of Example 5, Example 6 and Comparative Example 1.

The results are shown in FIG. 3 together with the results of Comparative Example 1.

EXAMPLE 7

A pressure roller for a heat-pressure fixing device having an elastic layer of a solid silicone rubber composition according to the present invention was prepared in the same manner as in Example 3.

The resultant pressure roller was incorporated in the heat-pressure fixing device shown in FIG. 1 and subjected to a continuous feeding fixing test under the same conditions as in Example 3.

As a result, even after 100,000 sheets of paper were passed through the fixing device, no attachment or contamination with toner was caused on the pressure roller surface nor was caused attachment of toner onto the fixing roller surface. In the fixed toner images, no poor image, contamination or dropout of image was observed at all, but good image quality and fixing performance were retained. Particularly, no paper wrinkle, paper stacking or jamming, or paper curl, was observed to show a good conveying characteristic of the fixing device. The pressure roller caused very little shape change, thus showing a good size stability.

EXAMPLE 8

A silicone rubber-coated pressure roller was prepared in the same manner as in Example 7 except that the silicone rubber composition prepared in Example 6 was used. The thus obtained pressure roller was used and evaluated in a continuous feeding fixing test similarly as in Example 7.

Even after 100,000 sheets of paper were passed through the fixing device, no attachment or contamination with toner was caused on the pressure roller surface nor was caused attachment of toner onto the fixing roller surface. No poor image, contamination or dropout of image was observed at all, but good image quality and fixing performance were retained. Particularly, no paper wrinkle, paper stacking or jamming, or paper curl, was observed to show a good conveying characteristic. The pressure roller caused very little shape change, thus showing a good size stability.

What is claimed is:

1. An elastic roller having a surface layer of a solid silicone rubber composition, said solid silicone rubber composition having been prepared by reacting a silicone composition mixture comprising (A) a vinyl group-containing organopolysiloxane, (B) an organohydrogenpolysiloxane, and (C) an unsaturated ester compound having (i) a perfluoroalkyl group containing 1–20 carbon atoms, (ii) a vinyl group represented by the formula wherein $R_2$ is hydrogen or methyl and (iii) a polyoxyethylene group having 5–30 ethylene oxide units, said mixture having been reacted in the presence of a platinum-based catalyst.

2. A roller according to claim 1, wherein the silicone composition mixture has been reacted while heating at a temperature of 100°–180° C. for 0.5–20 min.

3. A roller according to claim 1, wherein said unsaturated ester compound is selected from the group consisting of compounds represented by the formulas (A)–(E) shown below:

wherein $R^1$ denotes a monovalent hydrocarbon group, $R_2$ denotes hydrogen or methyl group, n denotes an integer of 1–20, L denotes and m denotes an integer of 5–30;

wherein $R_3$ denotes hydrogen atom or methyl group, m denotes an integer of 5–30, and n denotes an integer of 1–20; Formula (C):

wherein $R_3$ denotes hydrogen atom or methyl group, m denotes an integer of 5–30, and n denotes an integer of 1–20;

wherein $R_3$ denotes hydrogen atom or methyl group, m denotes an integer of 5–30, and n denotes an integer of 1–20; and wherein $R_3$ denotes hydrogen atom or methyl group, m denotes an integer of 5–30, and n denotes an integer of 1–20.

4. A roller according to claim 1, wherein said unsaturated ester compound is contained in a proportion of 0.05–10 wt. % of the total weight of the silicone composition mixture.

5. A roller according to claim 1, wherein said silicone composition mixture comprises a terminal vinyl group-containing organosiloxane represented by the following formula (a):

wherein x denotes a positive integer.

6. A roller according to claim 5, wherein x in the formula (a) denotes an integer of 50–2000.

7. A roller according to claim 1, wherein said silicone composition mixture comprises a side vinyl group-containing organosiloxane represented by the following formula (b):

wherein y and z independently denote a positive integer.

8. A roller according to claim 1, wherein said silicone composition mixture comprises a side vinyl group-containing organosiloxane represented by the following formula (c):

wherein k is 0 or a positive integer, y+k provides an integer of 50–2000, and z is an integer of 1–10.

9. A roller according to claim 1, wherein said silicone composition mixture comprises an organohydrogenpolysiloxane having a silicon atom-bonded hydrogen represented by the following formula (d):

(d)

wherein p and q independently denote a positive integer.

10. A roller according to claim 1, wherein said silicone composition mixture comprises a methylhydrogenpolysiloxane represented by the following formula (e):

(e)

wherein r is 0 or a positive integer, p+r provides an integer of 50–500, and q is an integer of 3–10.

* * * * *

UNITED STATES PATENT AND TRADEMARK OFFICE
CERTIFICATE OF CORRECTION

PATENT NO. : 5,482,775

DATED : January 9, 1996

INVENTORS : TOSHIYUKI MIYABAYASHI

It is certified that error appears in the above-identified patent and that said Letters Patent is hereby corrected as shown below:

ON TITLE PAGE

In [54] TITLE: "SILICON" should read --SILICONE--.

In [30] Foreign Application Priority Data: "64-238954" should read --01-238954--.

COLUMN 1

Line 1, "SILICON" should read --SILICONE--.
Line 4, "continuation-in-part" should be deleted.

COLUMN 2

Line 34, "term." should read --time.--.
Line 40, "an" should read --and an--.

UNITED STATES PATENT AND TRADEMARK OFFICE
CERTIFICATE OF CORRECTION

PATENT NO. : 5,482,775

DATED : January 9, 1996

INVENTORS : TOSHIYUKI MIYABAYASHI

It is certified that error appears in the above-identified patent and that said Letters Patent is hereby corrected as shown below:

COLUMN 3

Line 8, "group containing" should read
--group-containing--.

COLUMN 4

Line 67, "R" should read --n--.

COLUMN 5

Line 6, "denotes" (2nd occurrence) should read
--m denotes--.
Line 7, "R" should read --n--.

COLUMN 6

Line 38, "q and q" should read --p and q--.

UNITED STATES PATENT AND TRADEMARK OFFICE
CERTIFICATE OF CORRECTION

PATENT NO. : 5,482,775

DATED : January 9, 1996

INVENTORS : TOSHIYUKI MIYABAYASHI

It is certified that error appears in the above-identified patent and that said Letters Patent is hereby corrected as shown below:

COLUMN 8

Line 34, "surfacer" should read --surface,--.

COLUMN 10

Line 45, "min." should read --10 min.--.

COLUMN 12

Line 24, "<Fixing" should read --¶ <Fixing--.
Line 60, "Curl, should read --curl,--.

UNITED STATES PATENT AND TRADEMARK OFFICE
CERTIFICATE OF CORRECTION

PATENT NO. : 5,482,775

DATED : January 9, 1996

INVENTORS : TOSHIYUKI MIYABAYASHI

It is certified that error appears in the above-identified patent and that said Letters Patent is hereby corrected as shown below:

<u>COLUMN 15</u>

```
Line 42, "R¹" should read --R₁--.
Line 67, "Formula (C):" should be deleted.
```

Signed and Sealed this

Fourth Day of June, 1996

Attest:

BRUCE LEHMAN

Attesting Officer     Commissioner of Patents and Trademarks